United States Patent
Huang

(10) Patent No.: US 7,410,146 B2
(45) Date of Patent: Aug. 12, 2008

(54) DRAIN VALVE WITH FLOW CONTROL

(75) Inventor: ChaoYang Huang, Shanghai (CN)

(73) Assignee: Bestway Inflatables & Materials Corp., Carson, CA (US)

( * ) Notice: Subject to any disclaimer, the term of this patent is extended or adjusted under 35 U.S.C. 154(b) by 0 days.

(21) Appl. No.: 10/874,625

(22) Filed: Jun. 23, 2004

(65) Prior Publication Data

US 2005/0285066 A1    Dec. 29, 2005

(51) Int. Cl.
*F16K 31/44* (2006.01)
*F16K 51/00* (2006.01)

(52) U.S. Cl. .................. 251/215; 251/144; 251/345

(58) Field of Classification Search ............ 251/84, 251/88, 144, 343–346, 208–209, 215, 349, 251/351, 352
See application file for complete search history.

(56) References Cited

U.S. PATENT DOCUMENTS

| | | | | |
|---|---|---|---|---|
| 2,800,912 A | * | 7/1957 | McCamish et al. ....... 137/68.23 |
| 4,905,963 A | * | 3/1990 | Nichols ....................... 251/144 |
| 4,934,654 A | * | 6/1990 | Linnemann .................. 251/144 |
| 5,135,140 A | * | 8/1992 | Maguire et al. ............. 222/521 |
| 6,237,639 B1 | * | 5/2001 | Jougla et al. ............. 137/899.2 |
| 6,257,550 B1 | * | 7/2001 | Saputo et al. ............ 251/149.1 |

* cited by examiner

*Primary Examiner*—John Rivell
*Assistant Examiner*—Andrew J Rost
(74) *Attorney, Agent, or Firm*—William A. Loginov; Loginov & Associates PLLC

(57) ABSTRACT

A drain valve allows liquid to flow into or out of a liquid-container product by use of a restriction cap having a control ring that twists in and out of a base ring in order to control the flow. The restriction cap has a flow valve, having a top, apertures, and a base, and a control ring, having a top, base, center aperture, and protrusions. The control ring is sealed against the flow valve top by an O-ring when the drain valve is closed and is also sealed against the side of the flow valve. As the control ring is twisted into the base ring, control ring protrusions twist within channels inside the base ring and a piston valve is depressed, allowing liquid to flow. As the control ring is twisted out of the base ring, the control ring base blocks the flow apertures, preventing liquid from flowing.

15 Claims, 4 Drawing Sheets

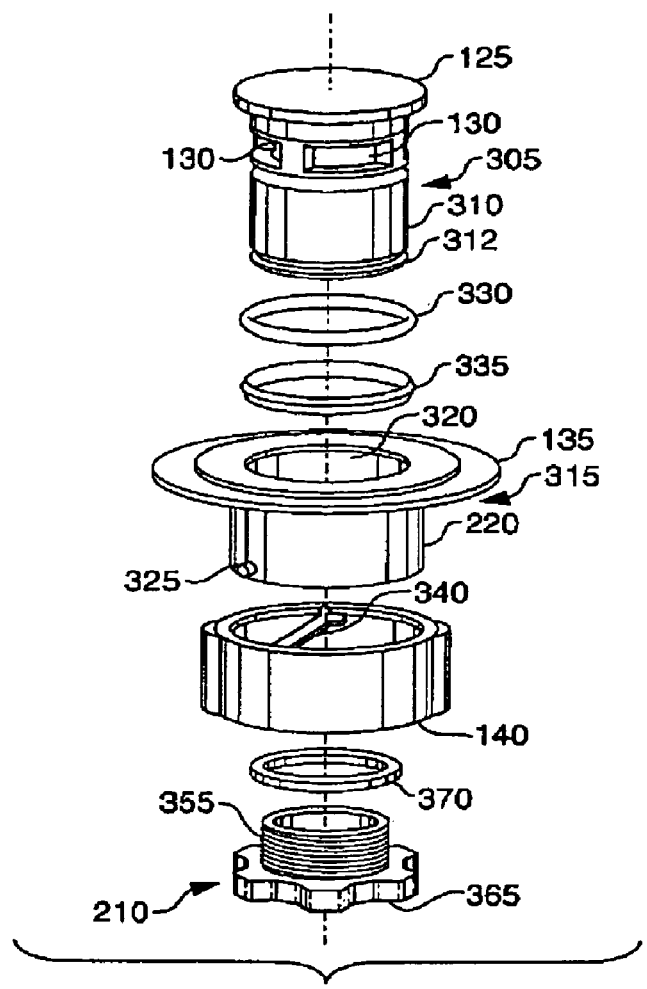
FIG. 3A
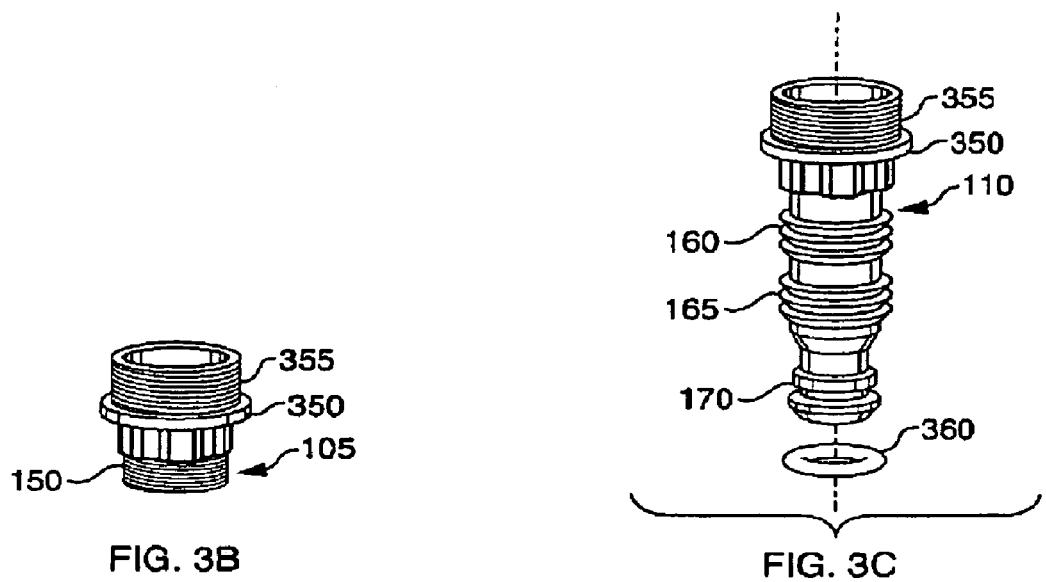
FIG. 3B
FIG. 3C

DRAIN VALVE WITH FLOW CONTROL

FIELD OF THE INVENTION

The invention relates to drain valves for liquid-container products and, in particular, to a drain valve with flow control for use with a large container for liquids.

BACKGROUND

Today's large liquid-container products, such as both portable and stationary above-ground swimming pools containing water, typically have a drain valve to allow removal of the liquid, either for storage of the portable container or during the winter season for the stationary one. Most of these drain valves require that the user insert his or her hand into the water in order to plug or unplug the drain valve. Further, most of these drain valves are not connectable to hoses for routing the draining liquids to a desired disposal area, instead allowing the liquids to run out directly into the area where the container is located. This can lead to various kinds of property and/or environmental damage, such as in the case of drainage of chlorinated pool water onto landscaping.

A prior art drain valve that is connectable to an ordinary garden hose and thus avoids the latter problem is disclosed in U.S. Pat. No. 6,257,550 (Saputo et al). The valve of Saputo et al has a tubular body with a mating member and a hose connector in communication with each other, the hose connector being disposable along the drain valve passageway and releasably attachable to the valve body by a cap. The hose connector has at least one prong that, when the hose connector is fully inserted into the valve passageway, forces open a drain plug blocking the passageway and allows liquids to drain from the container in which the valve is installed. The plug also has a pull tab and is attached to the drain valve body by a flexible stem. The hose connector can take a variety of forms, allowing it to be connected to either a conventionally sized U.S. garden hose or to the variably-sized hoses found in many other countries.

The valve of Saputo et al has a number of disadvantages. The valve is highly prone to water leakage during attachment of the hose because the prong pushes open the drain plug during installation of the hose connector, before the hose itself has been connected. The stem connecting the drain plug also presents a weak point that is likely to break with repeated usage, such as would be experienced by an inflatable or portable pool, leading to likely loss of the plug. Further, there is difficulty with plug removal in any embodiment that does not employ the hose connector prong to push out the drain plug, because of pressure on the plug from the liquid in the container. Pulling on the plug pull tab to remove the plug under these circumstances exerts extreme stress on the plug pull tab and/or stem, increasing the likelihood of breakage and ultimate loss of the plug. In addition, the user is still required to put his or her hand into the water in order to plug or unplug the valve. A further disadvantage is that, if the hose and connector are left connected during use of the pool, the hose and connector will tend to leak water out of the pool because of leakage around the plug.

What has been needed, therefore, is a drain valve for liquid-container products that allows connection of a drainage hose, that prevents leakage of liquids from the container during installation of the drainage hose, that prevents leakage of liquids from the valve if the hose is left connected, that is not prone to breakage after repeated use, that does not require the user to put his or her hand in the water, and that is easy to operate under all conditions.

OBJECTS OF THE INVENTION

Accordingly, an object of the present invention is to provide a drain valve that prevents leakage of liquids from the container during installation of a drainage hose. A further object of the present invention is to provide a drain valve that is easy to operate under all conditions. Yet another object of the present invention is to provide a drain valve that will withstand repeated use without danger of breakage. Still another object of the present invention is to provide a more robust liquid-container product.

SUMMARY

These and other objectives are met by the present invention, which is a drain valve with flow control. The invention provides control over the opening and closing of the drain valve, allowing liquid to flow into or out of the liquid-container product only when desired, by use of a restriction cap having a control ring that twists in and out of a base ring in order to permit or block the flow of liquid in and out of the container. The invention may be used with a wide variety of hose connectors and or safety caps.

In one embodiment of the present invention, the restriction cap is comprised of a flow valve that has a flow valve top, flow apertures, a flow valve base, and flow valve threads and a control ring that has a control ring top, a control ring base, a control ring center aperture, and control ring protrusions. The control ring is sealed snugly against the flow valve top by means of an O-ring when the drain valve is in the closed position, in order to prevent liquid leakage through the flow apertures, and is sealed against the side of the flow valve by an O-ring at all times, in order to prevent water leakage via the channel within which the control ring moves in the base ring. The flow valve variably protrudes through the control ring by means of the control ring center aperture. The control ring of the restriction cap twists in and out of the base ring to control the flow of liquid in and out of the drain valve, with the control ring top coming to rest snugly against the top of the base ring when the drain valve is in the fully open position. As the control ring is twisted into the base ring, the control ring protrusions twist into channels inside the base ring and the piston valve is depressed, allowing liquid to flow into the drain valve.

The drain valve with flow control of the present invention therefore has two modes of operation. By twisting the exterior portion of the control ring, the flow of liquid is either permitted or restricted. Twisting the control ring down into the base ring allows liquid to flow from the container through the flow apertures into the drain valve and then out through the hose connector into the hose. Twisting the control ring out of the base until it meets the flow valve cap causes the control ring base to cover the flow apertures, preventing liquid from flowing from the container into the drain valve.

BRIEF DESCRIPTION OF THE DRAWINGS

FIGS. 3A-C are exploded top views of embodiments of the drain valve of the present invention;

DETAILED DESCRIPTION

The present invention is an advanced drain valve with flow control that is designed to control the opening and closing of the drain valve in order to allow liquid to flow into or out of the liquid-container product only when desired. The drain valve of the present invention has a restriction cap that replaces the drain plug found in the prior art drain valves, allowing attachment and detachment of drainage hoses without liquid leakage. It is suitable for use in any style of liquid-container product including, but not limited to, inflatable, portable, and stationary swimming pools, and is much more efficient and user-friendly than the valve of Saputo et al.

The drain valve with flow control of the present invention has an interchangeable hose connector and a restriction cap having a control ring that twists in and out of a base ring in order to control the flow of liquid in and out of the container. The valve is typically permanently welded into the liquid container at the base ring, being positioned so that the restriction cap is on the inside of the container and the hose connector is on the outside of the container.

Figure 1A:
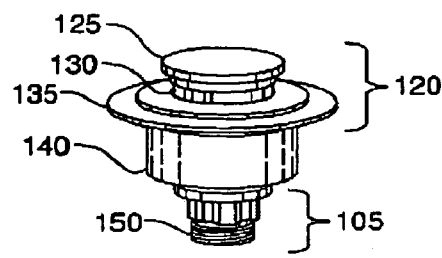
FIGS. 1A and 1B depict embodiments of the drain valve of the present invention in the open position.
Figure 1B:
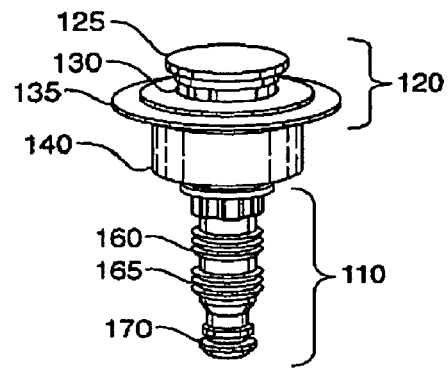

FIGS. 1A and 1B depict embodiments of the drain valve of the present invention in the open position, shown respectively with standard U.S. male hose connector 105 (FIG. 1A) and with variable diameter hose connector 110 (FIG. 1B). As shown in FIGS. 1A and 1B, restriction cap 120 is comprised of a flow valve having flow valve top 125 and flow apertures 130 and a control ring having control ring top 135. The number of flow apertures 130 is typically selected for either manufacturing convenience or optimum liquid flow rate for the intended application. The control ring of restriction cap 120 twists in and out of base ring 140 to control the flow of liquid in and out of the drain valve, with control ring top 135 coming to rest snugly against the top of base ring 140 when the drain valve is in the fully open position. In FIG. 1A, U.S. male connector 105 has threads 150 suitable for mating with the female end of a standard diameter U.S. garden hose. In FIG. 1B, variable diameter hose connector 110 has a number of threaded segments 160, 165 and connectors 170 suitable for accepting hoses of non-standard diameters, such as those commonly found in other countries. While male hose connectors are depicted, female connectors are also suitable for use in the present invention and would typically then be connected to the male end of a standard hose. In a typical embodiment, the valve is sealed into the wall of the container at base ring 140, with restriction cap 120 on the inside of the container and the selected hose connector on the outside.

Figure 2A:
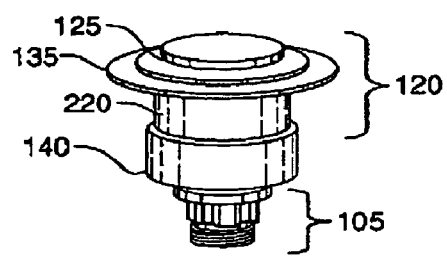
FIGS. 2A-C depict embodiments of the drain valve of the present invention in the closed position.
Figure 2B:
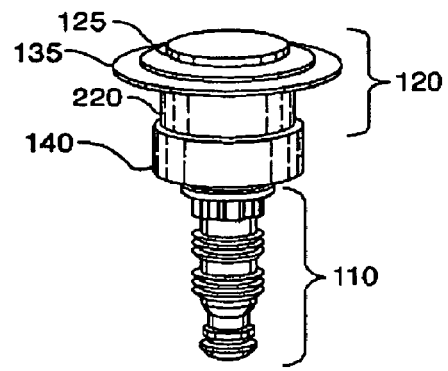
Figure 2C:
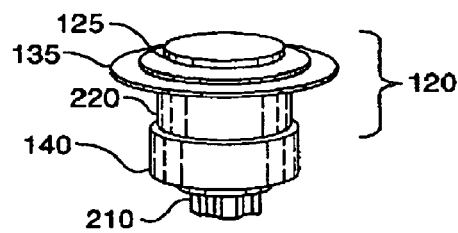

FIGS. 2A-C depict embodiments of the drain valve of the present invention in the closed position, shown respectively with standard U.S. male hose connector 105 (FIG. 2A), with variable diameter hose connector 110 (FIG. 2B), and with safety cap 210 (FIG. 2C). As shown in FIGS. 2A-C, restriction cap 120 is comprised of a flow valve having flow valve top 125 and a control ring having control ring top 135 and control ring base 220. Control ring base 220 of restriction cap 120 twists in and out of base ring 140 to control the flow of liquid in and out of the drain valve, with control ring top 135 coming to rest snugly against flow valve top 125 when the drain valve is in the fully closed position.

The drain valve with flow control of the present invention therefore has two modes of operation. By twisting the exterior portion of the control ring, the flow of liquid is either permitted or restricted. Twisting the control ring down into the base ring allows liquid to flow from the container through the flow apertures into the drain valve and then out through the hose connector into the hose. Twisting the control ring out of the base until it meets the flow valve cap causes the control ring base to cover the flow apertures, preventing liquid from flowing from the container into the drain valve. Because of the tight seal formed by the restriction cap, the hose may be left connected to the container during container use without risk of leakage of liquids from the container via the connector and/or hose. If desired, the valve of the present invention may also be used for filling the liquid-container product by connecting the opposite end of the attached hose to a liquid source.

FIGS. 3A-C are exploded top views of embodiments of the drain valve of the present invention. In FIG. 3A, the restriction cap is comprised of flow valve 305 having flow valve top 125, flow apertures 130, flow valve base 310, and flow valve threads 312 and control ring 315 having control ring top 135, control ring base 220, control ring center aperture 320, and control ring protrusions 325. Control ring 315 is sealed snugly against flow valve top 125 by means of O-ring 330 when the drain valve is in the closed position, in order to prevent liquid leakage through flow apertures 130, and is also sealed against the side of flow valve 305 by O-ring 335, in order to prevent liquid leakage via the channel within which control ring 315 moves in base ring 140. Flow valve 305 variably protrudes through control ring 315 via control ring center aperture 320. Control ring 315 twists in and out of base ring 140 to control the flow of liquid in and out of the drain valve, with control ring top 135 coming to rest snugly against the top of base ring 140 when the drain valve is in the fully open position. As control ring 315 is twisted into base ring 140, control ring protrusions 325 twist within channels inside base ring 140 and piston valve 340 is depressed, allowing liquid to flow from the drain valve into the hose connector.

FIGS. 3A-C also depict three of the many alternative hose connectors and caps that can be used with the present invention: standard U.S. male hose connector 105 (FIG. 3B), variable diameter hose connector 110 (FIG. 3C), and safety cap 210 (FIG. 3A). In FIG. 3B, U.S. male connector 105 has threads 150 suitable for mating with the female end of a standard diameter U.S. garden hose, hose connector base 350, and valve connection threads 355. In FIG. 3C, variable diameter hose connector 110 has a number of threaded segments 160, 165 and connectors 170 suitable for accepting hoses of non-standard diameters, hose connector base 350, valve connection threads 355, and optional hose connection O-ring 360. In FIG. 3A, safety cap 210 has safety cap base 365 and valve connection threads 355 and is typically employed when the liquid-container product is full of liquid, in order to protect against accidental discharge of the liquid from the container. All of the alternative connectors and safety caps may employ O-ring 370 to provide a tight seal when screwed into base ring 140. While three specific embodiments of hose connectors and safety caps are shown, it will be clear to anyone of ordinary skill in the art that any suitable form of hose connector or safety cap known in the art may be used with the drain valve of the present invention.

Figure 4:
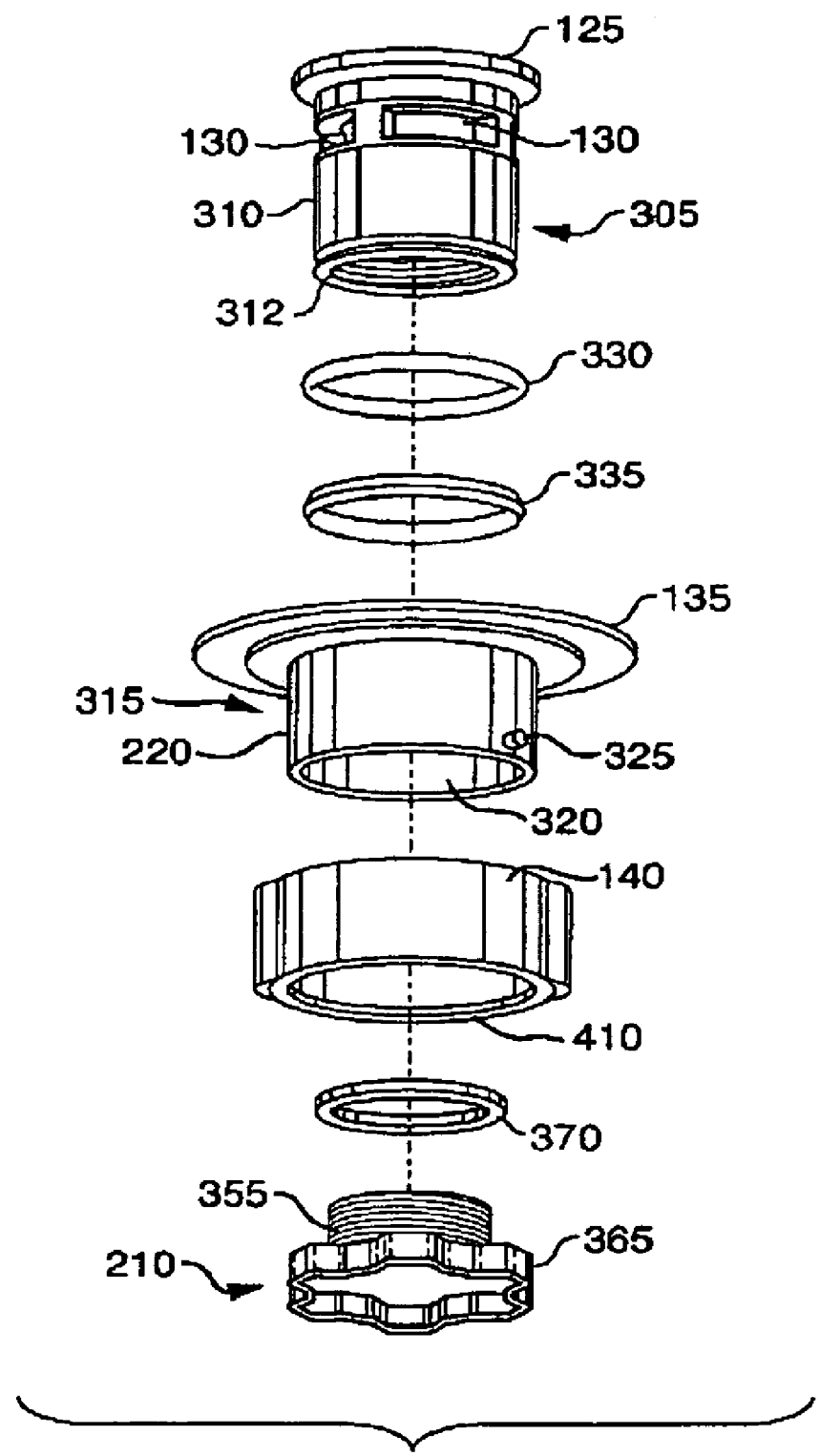
FIG. 4 is an exploded bottom view of an embodiment of the drain valve of the present invention.

FIG. 4 is an exploded bottom view of an embodiment of the drain valve of the present invention. In FIG. 4, the restriction cap is comprised of flow valve 305 having flow valve top 125, flow apertures 130, flow valve base 310, and flow valve threads 312 and control ring 315 having control ring top 135, control ring base 220, control ring center aperture 320, and control ring protrusions 325. Control ring 315 is sealed snugly against flow valve top 125 by means of O-ring 330 when the drain valve is in the closed position, in order to prevent leakage of liquid through flow apertures 130, and is also sealed against the side of flow valve 305 by O-ring 335, in order to prevent leakage of liquid via the channel within which control ring 315 moves in base ring 140. Flow valve 305 variably protrudes through control ring 315 via control ring center aperture 320. Control ring 315 twists in and out of base ring 140 to control the flow of liquid in and out of the drain valve, with control ring top 135 coming to rest snugly against the top of base ring 140 when the drain valve is in the fully open position. As control ring 315 is twisted into base ring 140, control ring protrusions 325 twist into channels 410 inside base ring 140, allowing water flow into flow valve 305. Safety cap 210 has safety cap base 365 and flow valve connection threads 355 and employs O-ring 370 to provide a tight seal when safety cap 210 is screwed into base ring 140.

Figure 5:
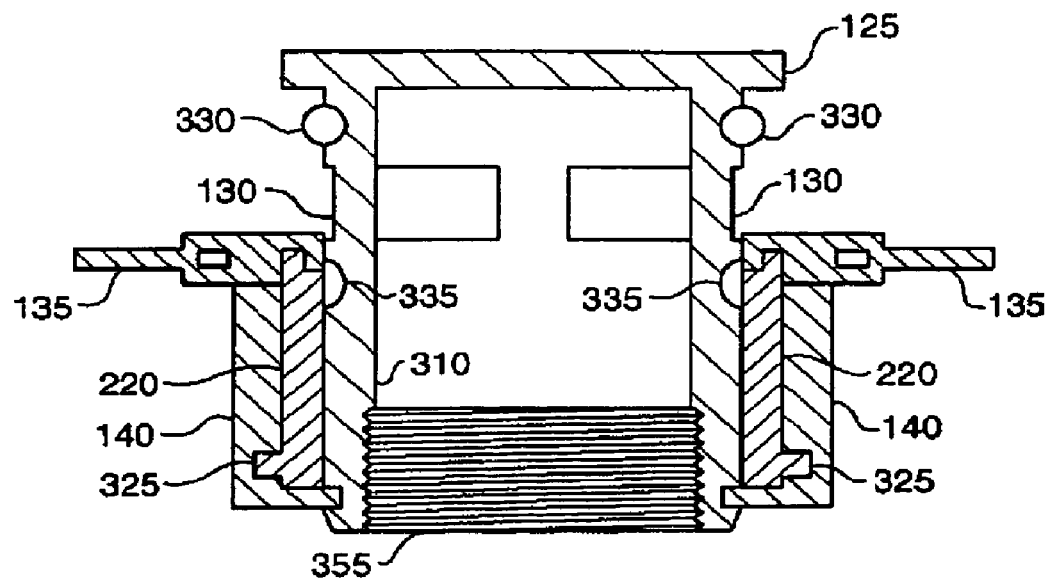
FIG. 5 is a cross section of an embodiment of the drain valve of the present invention in the open position.

FIG. 5 is a cross section of an embodiment of the drain valve of the present invention in the open position. FIG. 5 depicts flow valve top 125, flow apertures 130, flow valve base 310, control ring top 135, control ring base 220, and control ring protrusions 325. The control ring will be sealed snugly against flow valve top 125 by means of O-ring 330 when the drain valve is in the closed position, in order to prevent leakage of liquid through flow apertures 130, and is also sealed against the side of the flow valve by O-ring 335, in order to prevent leakage of liquid via the channel within which the control ring moves in base ring 140. As the control ring is twisted into base ring 140, control ring protrusions 325 twist in channels inside base ring 140, allowing liquid to flow through flow valve apertures 130 into the drain valve and out through the hose connector. The various hose connectors and/or safety caps are screwed into base ring 140 by means of valve connection threads 355.

Figure 6:
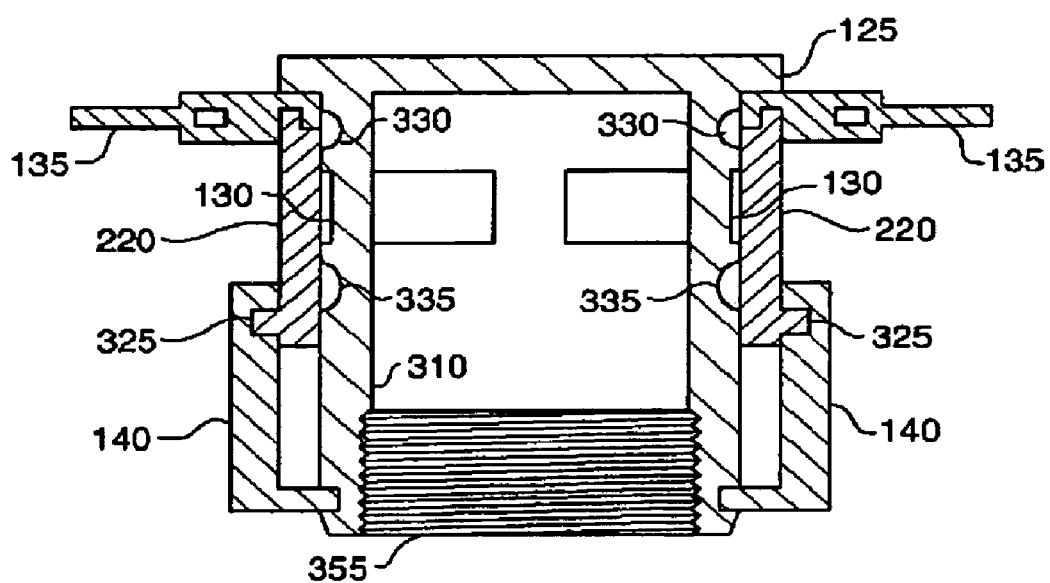
FIG. 6 is a cross section of an embodiment of the drain valve of the present invention in the closed position.

FIG. 6 is a cross section of an embodiment of the drain valve of the present invention in the closed position. FIG. 6 depicts flow valve top 125, flow apertures 130, flow valve base 310, control ring top 135, control ring base 220, and control ring protrusions 325. The control ring is sealed snugly against flow valve top 125 by means of O-ring 330 when the drain valve is in the closed position, in order to prevent liquid leakage through flow apertures 130, and is also sealed against the side of flow valve 305 by O-ring 335, in order to prevent liquid leakage via the channel within which control ring 315 moves in base ring 140. The control ring of the restriction cap twists in and out of base ring 140 to control the flow of liquid in and out of the drain valve, with control ring top 135 resting snugly against the top of base ring 140 when the drain valve is in the fully open position. As the control ring is twisted out of base ring 140, control ring protrusions 325 move within the channels inside base ring 140 in the direction of the arrows, causing flow apertures 130 to be covered by control ring base 220 as shown, preventing liquid from flowing from the container into the drain valve. The various alternative hose connectors and/or safety caps are screwed into base ring 140 by means of valve connection threads 355.

The drain valve of the present invention may be made out of any suitable material known in the art including, but not limited to, those materials known to be suitable for the prior art valves, such as plastics, nylon, metals, including alloys, and composites, such as plastic incorporating carbon fiber, graphite, or carbon Kevlar. The preferred material is acrylonitrile butadiene styrene resin (ABS). The valve of the present invention may be made by any suitable method known in the art including, but not limited to, those methods known to be suitable for manufacturing the prior art valves, such as injection molding or conventional molding. The preferred method of manufacture is injection molding. The valve is typically permanently welded into the liquid-container material, using any suitable method known in the art.

The present invention, therefore, provides a drain valve that prevents leakage of liquids from the container during installation of a drainage hose. The valve of the present invention is easy to operate under all conditions and will withstand repeated use without danger of breakage, thereby providing for a more robust liquid-container product. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A drain valve, comprising:
    a restrictor cap, comprising:
        a flow valve having a flow valve top mated with a flow valve base that contains at least one flow valve aperture just below the flow valve top; and
        a moveable control ring having a control ring aperture slidably surrounding the flow valve, and a control ring top mated to a control ring base, the control ring top remaining at all times below the flow valve top, the control ring base having at least one control ring protrusion; and
    a stationary base ring for receiving the moveable control ring to control operation of the drain valve, the base ring surrounding at least the control ring protrusion, the base ring further being sealed around the bottom portion of the flow valve base and having at least one interior channel for containing the control ring protrusion,
    wherein the channel protrudes partially into an interior surface of the stationary base ring and an exterior surface of the stationary base ring is a continuous, unbroken surface, the channel being constructed and arranged to rotationally receive the control ring protrusion such that rotational movement of the control ring causes the protrusions to rotate within the channel to thereby open or close the drain valve.

2. The drain valve of claim 1, further comprising a hose connector releasably connected to the base ring.

3. The drain valve of claim 1, further comprising a safety cap releasably connected to the base ring.

4. The drain valve of claim 1, further comprising an O-ring surrounding the top of the flow valve base for forming a seal with the control ring base when the drain valve is closed.

5. The drain valve of claim 1, further comprising an O-ring surrounding the flow valve base for forming a seal with the control ring base to prevent liquid leakage through the base ring channel.

6. A valve, comprising:
    a stationary base ring;
    a flow valve connected into the base ring and having a flow valve top mated with a flow valve base that contains at least one flow valve aperture just below the flow valve top; and
    a movable control ring having a control ring aperture slidably surrounding the flow valve, a control ring top mated to a control ring base that is moveable with respect to the base ring to control operation of the valve, and at least one control ring protrusion attached to the control ring base and movably inserted within a channel in the base ring, the control ring top remaining at all times below the flow valve top, wherein the channel protrudes partially into an interior surface of the stationary base ring and an exterior surface of the stationary base ring is a continuous, unbroken surface, the channel being constructed and arranged to rotationally receive the control ring protrusion such that rotational movement of the control ring causes the protrusions to rotate within the channel to thereby open or close the drain valve.

7. The valve of claim 6, further comprising a hose connector releasably connected to the base ring.

8. The valve of claim 6, further comprising a safety cap releasably connected to the base ring.

9. The valve of claim 6, further comprising an O-ring surrounding the top of the flow valve base for forming a seal with the control ring base when the drain valve is closed.

10. The valve of claim 6, further comprising an O-ring surrounding the flow valve base for forming a seal with the control ring base to prevent liquid leakage through the base ring channel.

11. A liquid-container product having a container for holding liquids and a drain valve, the drain valve comprising:
a stationary base ring;
a flow valve connected into the base ring and having a flow valve top mated with a flow valve base that contains at least one flow valve aperture just below the flow valve top; and
a movable control ring having a control ring aperture slidably surrounding the flow valve, a control ring top mated to a control ring base that is moveable with respect to the base ring to control operation of the drain valve, and at least one control ring protrusion attached to the control ring base and movably inserted within a channel in the base ring, the control ring top remaining at all times below the flow valve top, wherein the channel protrudes partially into an interior surface of the stationary base ring and an exterior surface of the stationary base ring is a continuous, unbroken surface, the channel being constructed and arranged to rotationally receive the control ring protrusion such that rotational movement of the control ring causes the protrusions to rotate within the channel to thereby open or close the drain valve.

12. The liquid-container product of claim 11, further comprising a hose connector releasably connected to the base ring of the drain valve.

13. The liquid-container product of claim 11, further comprising a safety cap releasably connected to the base ring of the drain valve.

14. The liquid-container product of claim 11, the drain valve further comprising an O-ring surrounding the top of the flow valve base for forming a seal with the control ring base when the drain valve is closed.

15. The liquid-container product of claim 11, the drain valve further comprising an O-ring surrounding the flow valve base for forming a seal with the control ring base to prevent liquid leakage through the base ring channel.

* * * * *